(12) United States Patent
Dufty

(10) Patent No.: US 7,997,826 B2
(45) Date of Patent: Aug. 16, 2011

(54) ROLLER ASSEMBLY

(75) Inventor: Raymond Jeffrey Dufty, Ernest (AU)

(73) Assignee: Tru-Turf Pty Ltd, Earnest, Queensland (AU)

( * ) Notice: Subject to any disclaimer, the term of this patent is extended or adjusted under 35 U.S.C. 154(b) by 23 days.

(21) Appl. No.: 12/387,389

(22) Filed: May 1, 2009

(65) Prior Publication Data
US 2009/0238644 A1 Sep. 24, 2009

Related U.S. Application Data

(63) Continuation-in-part of application No. PCT/AU2007/001669, filed on Nov. 1, 2007.

(30) Foreign Application Priority Data
Nov. 1, 2006 (AU) ................................ 2006906096

(51) Int. Cl.
*E01C 19/26* (2006.01)

(52) U.S. Cl. ....................................... 404/132; 404/125

(58) Field of Classification Search .......... 404/121–123, 404/125–128, 131, 132; 172/349, 350, 537, 172/539, 527; 492/39, 40, 47
See application file for complete search history.

(56) References Cited

U.S. PATENT DOCUMENTS

| | | | | |
|---|---|---|---|---|
| 699,694 A * | 5/1902 | Longenecker | .................. | 404/122 |
| 1,187,251 A | 6/1916 | Bultman | | |
| 1,392,161 A * | 9/1921 | Hilts | ................................ | 404/89 |
| 1,749,647 A * | 3/1930 | Poujaud | ......................... | 404/132 |
| 2,114,378 A * | 4/1938 | Gundlach | ...................... | 101/153 |
| 2,245,865 A * | 6/1941 | Le Tourneau | .................. | 404/125 |
| 2,333,041 A * | 10/1943 | Poulter | ............................ | 404/75 |
| 2,528,116 A * | 10/1950 | Clemson | ........................... | 56/249 |
| 3,338,315 A * | 8/1967 | Ketel | .............................. | 172/537 |
| 3,796,505 A * | 3/1974 | Buhler | ........................... | 404/132 |
| 4,340,351 A * | 7/1982 | Owens | ............................ | 425/456 |
| 4,905,771 A * | 3/1990 | Stark | ............................... | 172/572 |
| 5,468,267 A | 11/1995 | Dufty et al. | | |
| 5,662,173 A * | 9/1997 | Blesing | ......................... | 172/526 |
| 6,457,903 B1 * | 10/2002 | Dufty | ............................. | 404/122 |
| 7,544,012 B2 * | 6/2009 | Lura | ............................... | 404/118 |
| 7,704,012 B2 * | 4/2010 | Lura | ................................ | 404/97 |
| 2002/0025224 A1* | 2/2002 | Williamson | ................... | 404/118 |
| 2004/0131419 A1* | 7/2004 | Hammond | ..................... | 403/298 |
| 2005/0147470 A1* | 7/2005 | Fimbinger | ...................... | 404/131 |
| 2006/0104718 A1* | 5/2006 | Paske | ............................. | 404/128 |
| 2007/0134064 A1* | 6/2007 | Lura | ............................... | 404/118 |
| 2009/0252554 A1* | 10/2009 | Lura | ............................... | 404/119 |

FOREIGN PATENT DOCUMENTS

| | | |
|---|---|---|
| DE | 26 18 841 B1 | 8/1977 |
| SE | 8801-757-9 A | 11/1989 |
| WO | WO 00/09809 A1 | 3/1999 |
| WO | WO 03/037063 A1 | 5/2003 |

* cited by examiner

*Primary Examiner* — Robert Pezzuto
*Assistant Examiner* — Matthew Troutman
(74) *Attorney, Agent, or Firm* — Hudak, Shunk & Farine Co. LPA

(57) ABSTRACT

A roller assembly adapted to follow ground contours during operation which includes a pair of roller components each having respective inner ends connected to each other by a flexible and movable primary coupling and having their respective outer ends connected to a support shaft which extends through a hollow interior of each roller component by a secondary coupling.

9 Claims, 11 Drawing Sheets

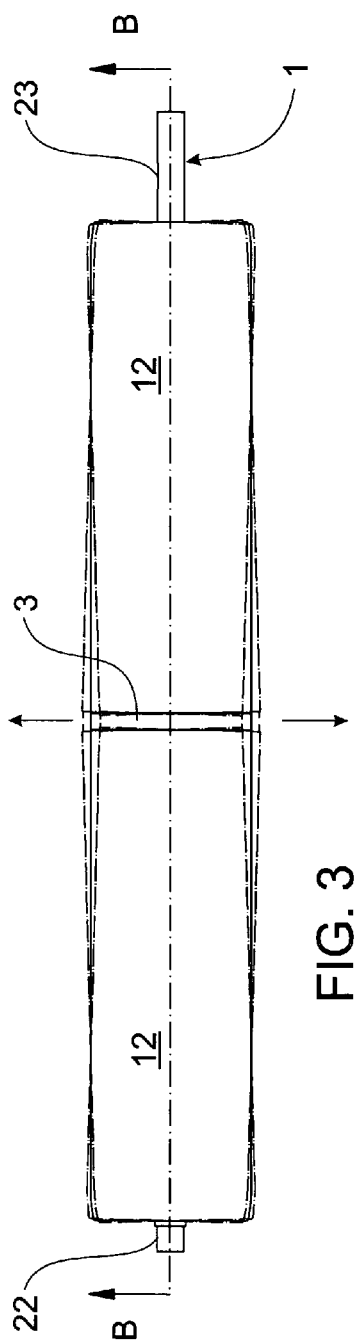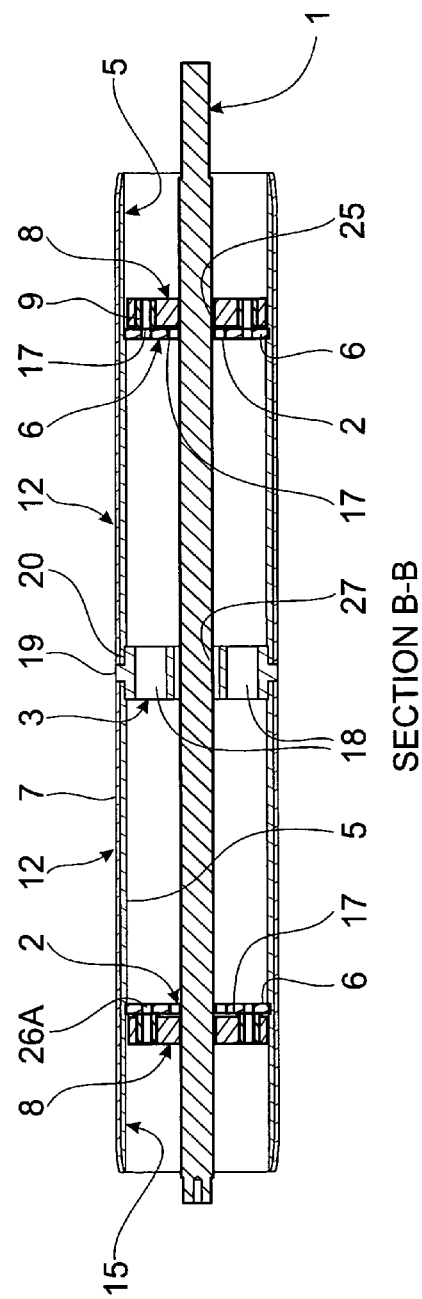

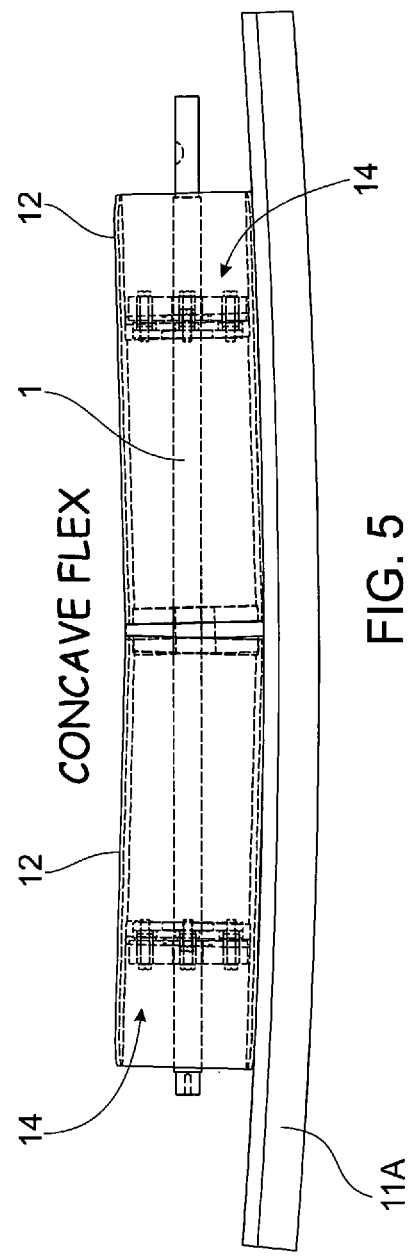
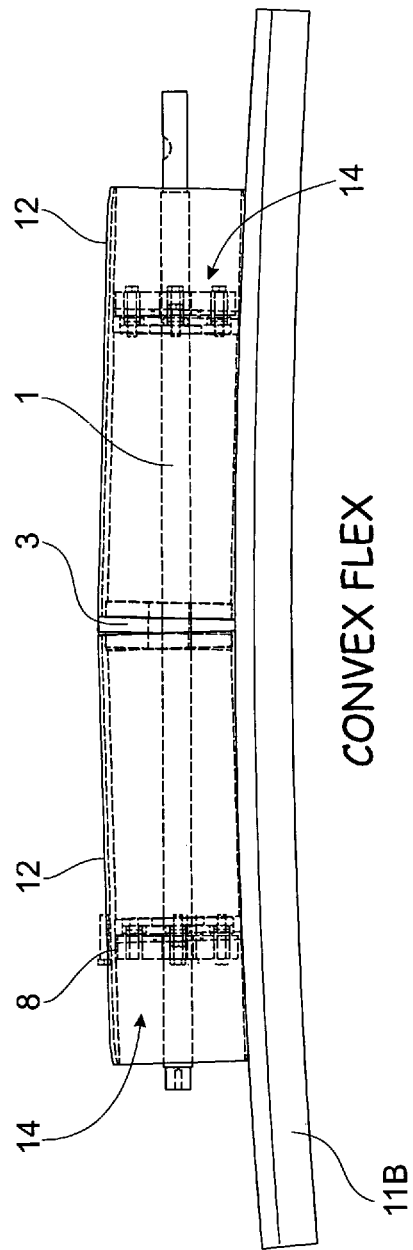
FIG. 5
FIG. 6

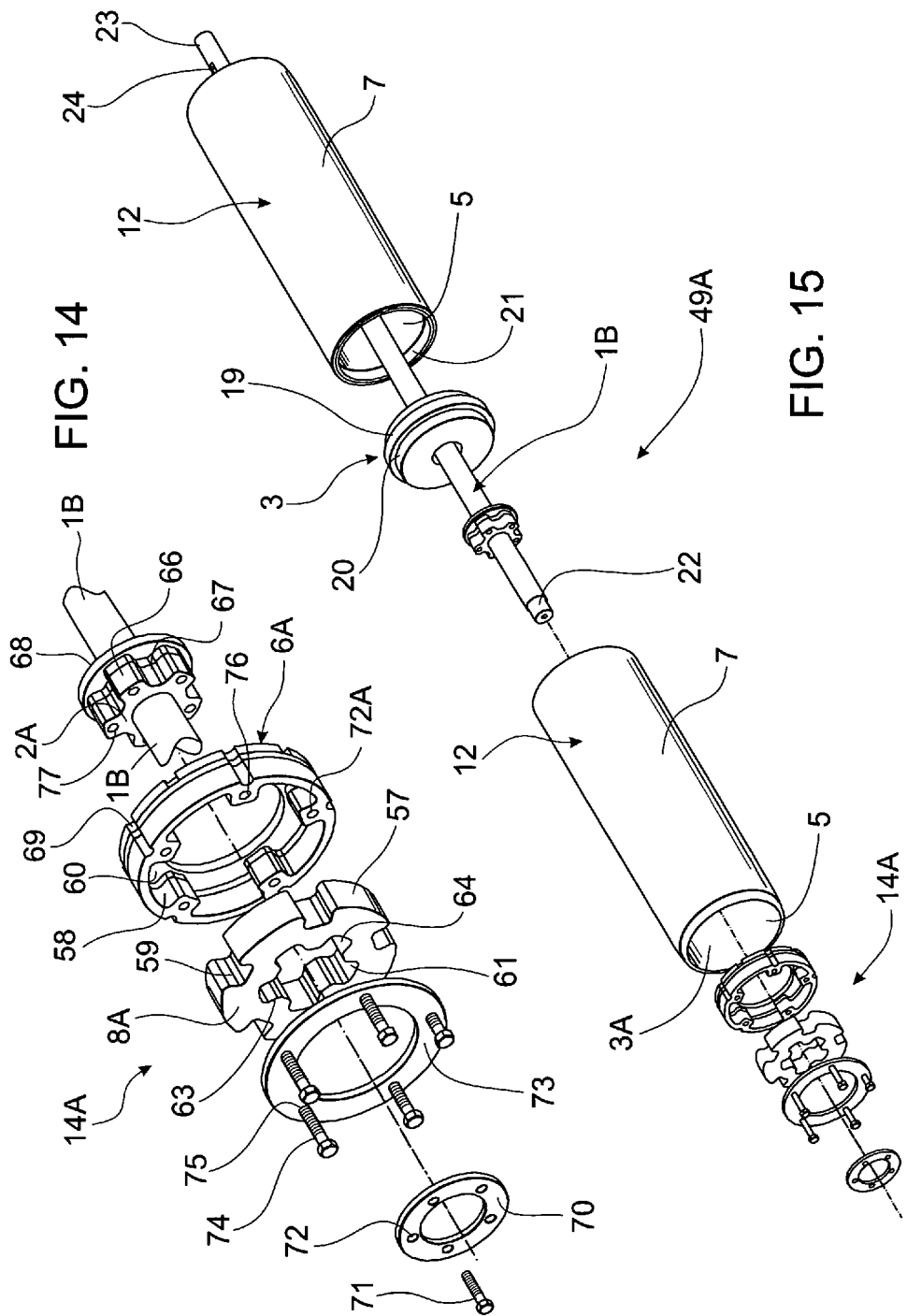

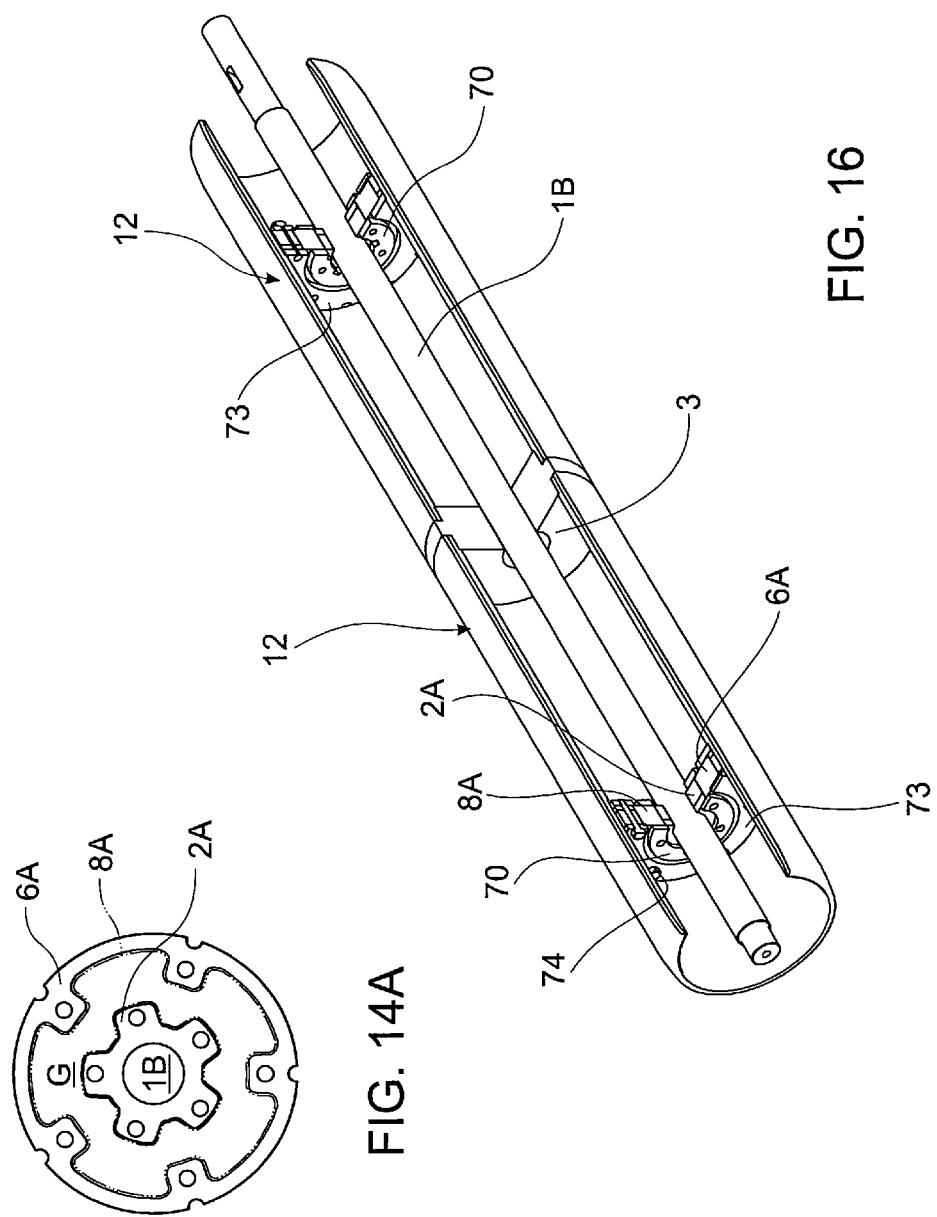

a continuation-in-part of International Application PCT/AU2007/001669, with an international filing date of Nov. 1, 2007, which claimed the priority of Australian Patent Application 2006906096, filed Nov. 1, 2006.

FIELD OF THE INVENTION

This invention relates to an improved roller assembly which may be used as a drive roller or idler roller in machines or vehicles incorporating rolling apparatus for rolling of turf or grass surfaces inclusive of golf greens and bowling greens. However this is not the only application of the roller assembly of the invention which could be employed in relation to rolling of snowfields, road surfaces during preparation of roads and rolling of other uneven surfaces such as sand.

BACKGROUND OF THE INVENTION

One conventional rolling apparatus is described in U.S. Pat. No. 6,457,903 which has a mobile main frame and at least a pair of undercarriages attached to the main frame in side by side relationship wherein each undercarriage has one or more smoothing rollers and there is further provided a control arm or plate pivotally attached to the main frame about a horizontal axis wherein each undercarriage is pivotally attached to the control arm or plate. There was further provided a transmission interconnecting each undercarriage to an operating lever or joystick wherein actuation of the operating lever or joystick causes reciprocatable pivotal movement of each undercarriage such that in use the or each smoothing roller closely follows ground contours.

It is important in rolling of golf greens or bowling greens that smoothing or idler rollers as described in U.S. Pat. No. 6,457,903 closely follow ground contours. If such is not the case the smoothing rollers may leave indentation lines or unsightly marks on the greens and this was detrimental to achievement of a smooth and even grass surface. Another problem of using smoothing rollers that did not closely follow ground contours was that surface corrugations in the greens still remained after repeated roller operations.

However while this objective was achieved in U.S. Pat. No. 6,457,903 by the use of pivotal movement of each undercarriage to closely follow surface undulations or corrugations it will be appreciated that U.S. Pat. No. 6,457,903 still incorporated a conventional drive roller shaft which was provided with a pair of stub axles at each end thereof which were attached to mounting plates rigidly attached to the chassis of the rolling apparatus. Each stub axle was also mounted in bearing carriers carrying bearings for each stub axle so as to enable the drive roller to rotate relative to the chassis. Another conventional arrangement was that the drive roller was rigidly mounted to a support shaft which extended through each end of the drive roller thereby providing the pair of stub axles. However these conventional drive roller mounting arrangements had disadvantages in that (i) on uneven ground there was created greater ground pressure resulting in an uneven surface finish due to lines, marks or impressions left on the ground surface after passage of the drive roller. Other disadvantages were (ii) that the drive roller had reduced width compared to each smoothing roller, (iii) that there was less driving friction on the ground than desired which created loss of traction in certain driving conditions and situations, especially on increased slopes or wet turf and (iv) the drive roller was rigidly mounted to a support shaft which meant that the style of roller to be employed was limited being relatively short which was not adapted to follow ground contours.

It was also to be appreciated that in relation to each of the smoothing rollers in order to achieve an objective of each smoothing roller closely following ground contours it was necessary to mount a plurality of smoothing rollers in undercarriages as described above and this procedure was relatively complicated although it operated in a perfectly satisfactory manner.

SUMMARY OF THE INVENTION

It therefore is an object of the invention to provide a roller assembly that is adapted to follow ground contours during operation.

The roller assembly of the invention includes in a first embodiment a pair of roller components having respective inner ends connected to each other by a flexible and movable primary coupling and having their respective outer ends connected to a support shaft which extends through a hollow interior of each driven roller component by a secondary coupling.

In a second embodiment there may be one or more intermediate or floating roller components located between the pair of roller components, which may constitute end roller components. In this embodiment each of the end roller components are connected at their respective outer ends to the support shaft which extends through a hollow interior of each end roller component and each intermediate or floating roller component by the secondary coupling. However each of the inner ends of the end roller components are connected to an adjacent end of an adjoining intermediate or floating roller component by the flexible and movable primary coupling. In the case where there are more than one intermediate floating roller components, adjacent ends of each intermediate or floating roller components are connected to each other by additional flexible and movable primary couplings.

The flexible and movable primary coupling may comprise a disc or sleeve made from natural rubber, synthetic rubber or other form of flexible or elastomeric material. In one arrangement the flexible disc may have a plurality of holes to enhance flexibility or in another arrangement may have a relatively large central aperture to enhance flexibility. Preferably the flexible disc has a peripheral flange defining a pair of adjacent shoulders for supporting an adjacent end of a roller component.

In the case of the first or second embodiment the primary coupling may be provided with a plurality of spigots or sockets which engage with corresponding sockets or spigots of an adjacent end of an end or driven roller component. In the case of adjacent ends of intermediate or floating roller components each of these may be interconnected by a primary coupling having spigots or sockets engaging with corresponding sockets or spigots of each adjacent end of the intermediate or floating roller component.

Reference may be made to a shaft assembly as shown in the accompanying drawings wherein FIG. 1 is an exploded perspective view of a roller assembly in accordance with the first embodiment of the invention;

FIG. 3 is a side view of the roller assembly shown in FIGS. 1 to 2;

FIG. 4 is a sectional view through line B-B of FIG. 3;

FIG. 5 is a side view of the roller assembly of FIG. 1 showing concave flexibility;

FIG. 6 is a side view of the roller assembly of FIG. 1 showing convex flexibility;

FIGS. 14, 14A, 15 and 16 relate to a third embodiment of the invention.

DETAILED DESCRIPTION OF THE INVENTION

Figure 1:
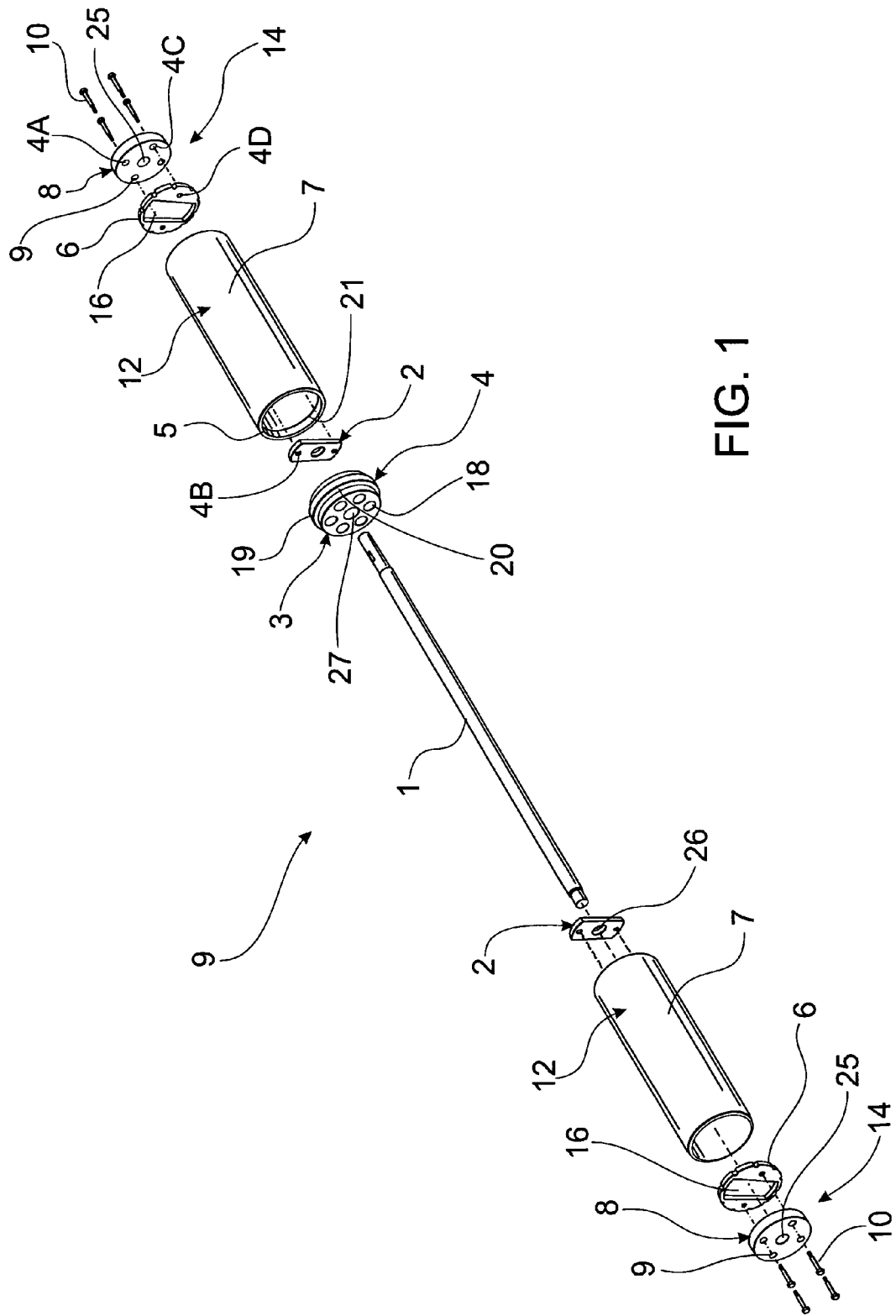

The roller assembly 9 shown in FIG. 1 has a roller support axle or shaft 1, end or driven roller components 12 each having an inner metal roller sleeve 5 and outer rubber sleeve 7, end coupling assemblies 14 each having inner support plate 2, outer support plate 6 and flexible or secondary coupling 8 between roller support axle 1 and each roller component 12, and fasteners 10 interconnecting each of secondary couplings 8 to inner support plate 2 and outer support plate 6. Each of secondary couplings 8 include metal inserts 9 in apertures 4A and 4C to facilitate insertion of fasteners 10. There is also provided a primary or floating coupling 3 between each of roller components 12. Coupling 3 is also provided with flange 19 which abuts each of roller components 12 and shoulders 20 for seating in corresponding groove 21 of each roller component 12.

Figure 2:
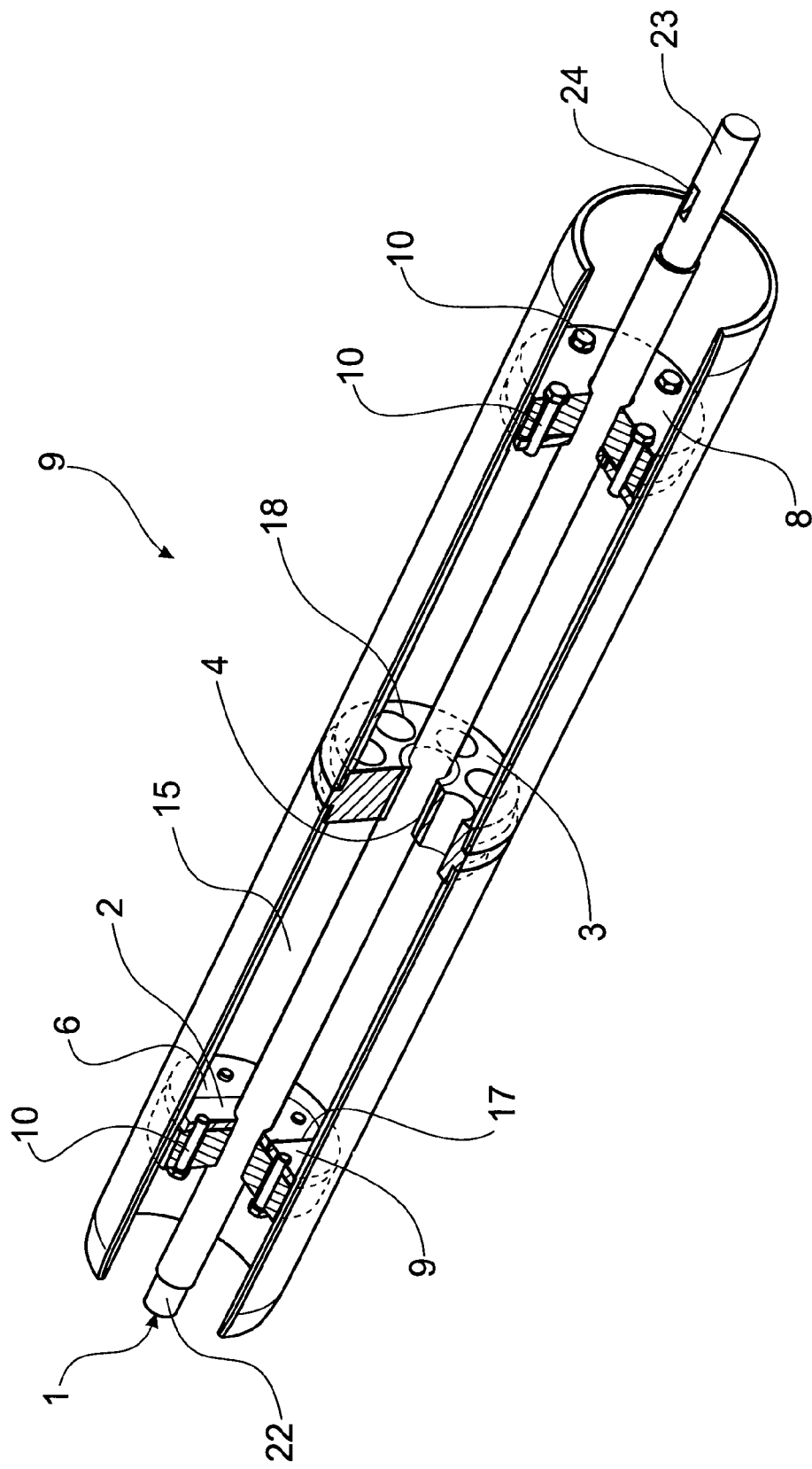
FIG. 2 is a partially cut away view of an assembled roller assembly shown in FIG. 1.

In FIG. 2 an assembled view of roller assembly 9 is shown and it will be noted that each of inner plates 2 is welded or otherwise attached to roller axle 1 and that each of outer plates 6 are welded or otherwise attached to inner surface 15 of drive roller inner sleeve 5. It will also be noted that each of outer plates 6 have an aperture 16 as best shown in FIG. 1 to facilitate insertion of inner plates 2 but that inner plates 2 are spaced from outer plates 6 as shown by spacing or gap 17. Also primary or central coupling 3 is provided with a plurality of apertures 18 to facilitate flexing of central coupling 3 when required. Primary coupling 3 is suitably made from natural rubber, synthetic rubber or other types of elastomeric material and this also applies to each of secondary couplings 8.

Roller shaft 1 is also provided with reduced diameter ends 22 and 23 for location of a bearing housing (not shown) of the type discussed above in relation to U.S. Pat. No. 6,457,903 and slot 24 for retention of a pulley wheel or sprocket also of the type shown in U.S. Pat. No. 6,457,903.

In FIGS. 3 to 4 there is shown clear separation of each of roller components 12 on each side of central coupling 3 with each roller component 12 abutting flange 19. Roller axle or shaft 1 as best shown in FIG. 1 passes through each of central apertures 25 of secondary or end couplings 8, central aperture 16 of each outer plate 6, aperture 26 of each inner plate 2 and central aperture 27 of central coupling 3.

FIG. 3 shows flexing of roller assembly 11 about central coupling 3 as indicated by the arrows wherein the lines in phantom shows both convex flexing and concave flexing.

FIGS. 5 to 6 show both concave flexing and convex flexing of each of roller components 12 about central coupling 3 which functions to keep each of roller components 12 aligned with each other. Each of end coupling assemblies 14 facilitate this flexing by allowing relative movement between roller shaft or axle 1 and each of roller components 12 to achieve a position as shown in FIG. 5 or 6 wherein each of roller components 12 hug closely the contours of the ground 11B in the case of a slight mound or hill in the case of FIG. 6 having regard to a convex flex and also in the case of a slight valley or depression of ground 11A in the case of FIG. 5 having regard to a concave flex.

Figure 7:
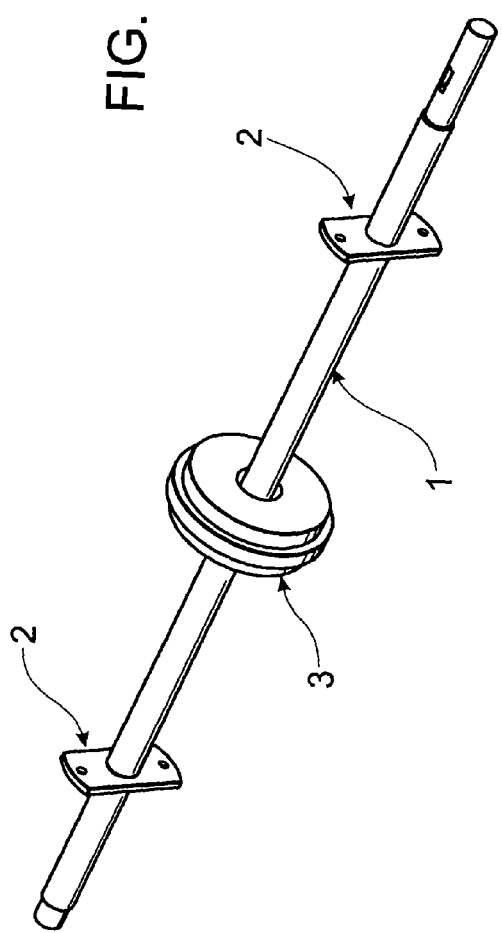
FIG. 7 is a perspective view of the support shaft prior to attachment to each roller component.
Figure 9:
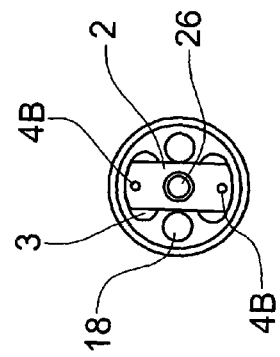
FIG. 9 is an end view of the support shaft shown in FIG. 7.
Figure 8:
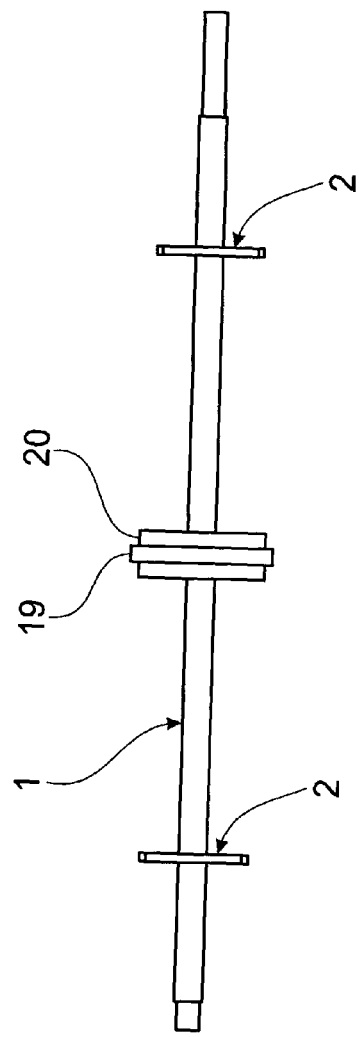
FIG. 8 is a side view of the support shaft shown in FIG. 7.

In the case of manufacture of roller assembly 11, this is shown in FIGS. 7-9 wherein central coupling 3 is located on roller shaft 1 before attachment of each of plates 2 by welding. Subsequently each of roller components 12 and their associated coupling assemblies 8 are attached to roller shaft 1 as shown in FIG. 2 and fasteners 10 inserted in co-aligned apertures 4A of end coupling 8 and apertures 4B of plate 2 as best shown in FIG. 1. Also fasteners 10 are inserted through co-aligned apertures 4C of end coupling 8 and apertures 4D of plate 6 which are best shown in FIG. 1.

Figure 10:
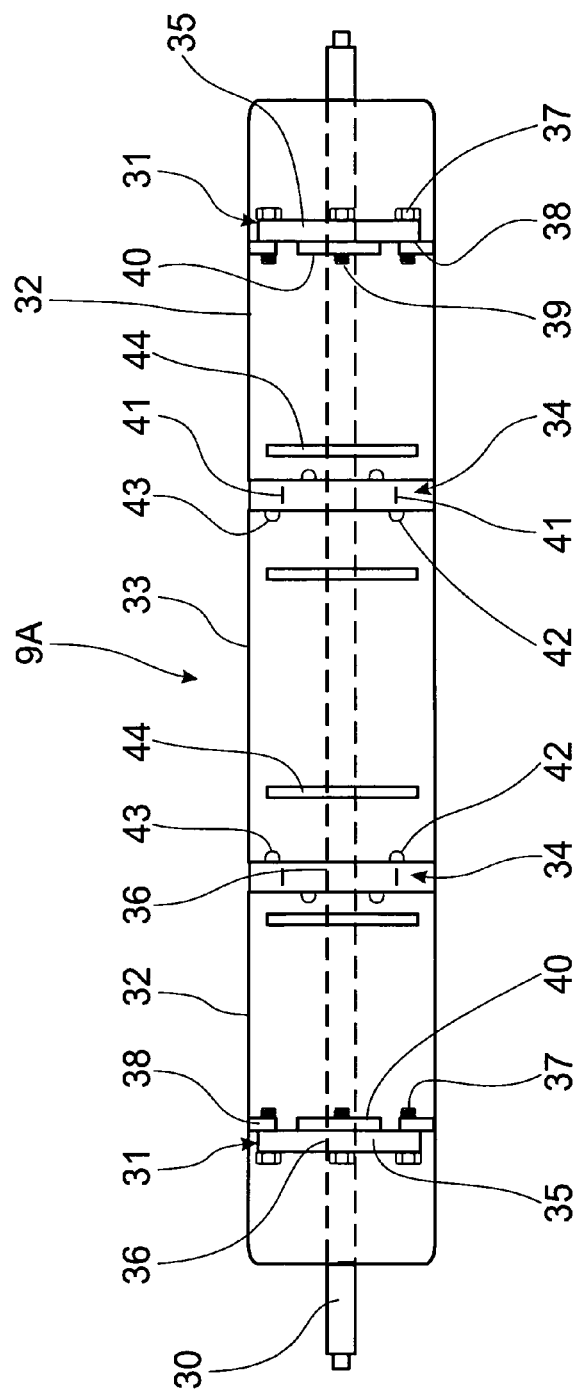
FIG. 10 is a schematic view of the second embodiment of the invention.

In FIG. 10 there is shown a roller assembly 9A having a support shaft 30, secondary coupling assemblies 31 interconnecting end or driven roller components 32 to support shaft 30 and a primary coupling 34 interconnecting the floating roller component 33 and adjacent ends of each driven roller component 32. Each secondary coupling assembly 31 has a flexible disc 35 with an aperture 36 to permit insertion of support shaft 30, lugs 38 welded to roller components 32 which are connected to flexible discs 35 by fasteners 37 and further fasteners 39 interconnecting metal disc 40 welded to support shaft 30 with flexible disc 35. Each of the floating couplings 34 has a relatively large aperture 41 to permit passage of shaft 30 and also to facilitate flexing of coupling 34 as well as spigots 42 engaging in corresponding sockets 43 of adjacent ends of roller components 32 or 33. The support shaft 30 is also provided with deflection plates 44 welded to support shaft 30.

Figure 11:
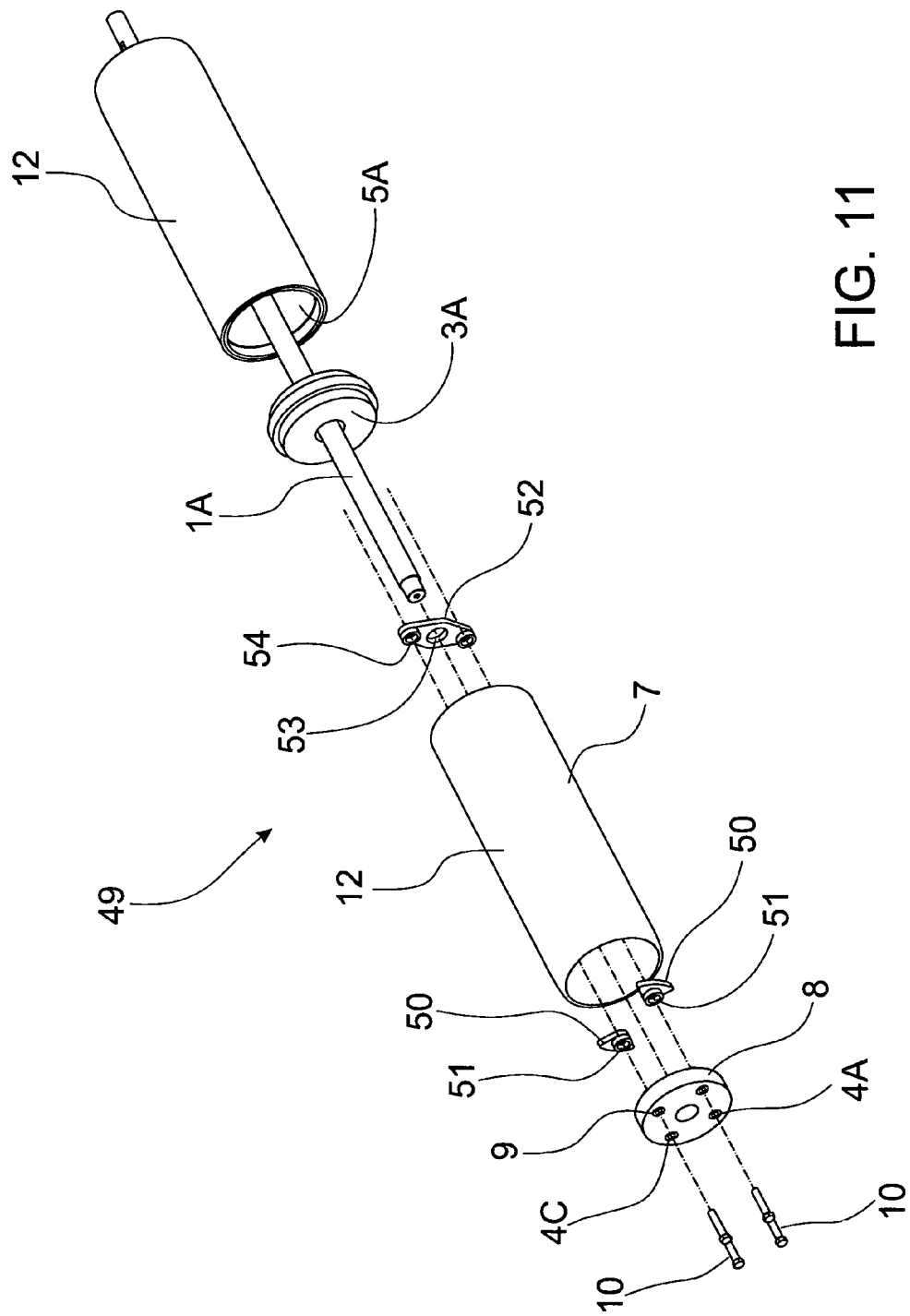
FIG. 11 is a perspective view similar to FIG. 1 showing another embodiment of the invention.

In another embodiment of the invention is shown in FIG. 11 which shows a view similar to FIG. 1 in relation to roller assembly 49. Plate 6 has now been replaced by opposed triangular shaped plates 50 each having an aperture 51 for passage of fasteners 10. Each of plates 50 are welded to the internal surface of metal sleeve 5A and plate 52 replaces plate 2 and is welded to shaft 1A. Plate 52 has central aperture 53 for passage of shaft 1A and attachment apertures 54 for passage of fasteners 10. Central coupling 3A has been modified to omit apertures 18.

Figure 12:
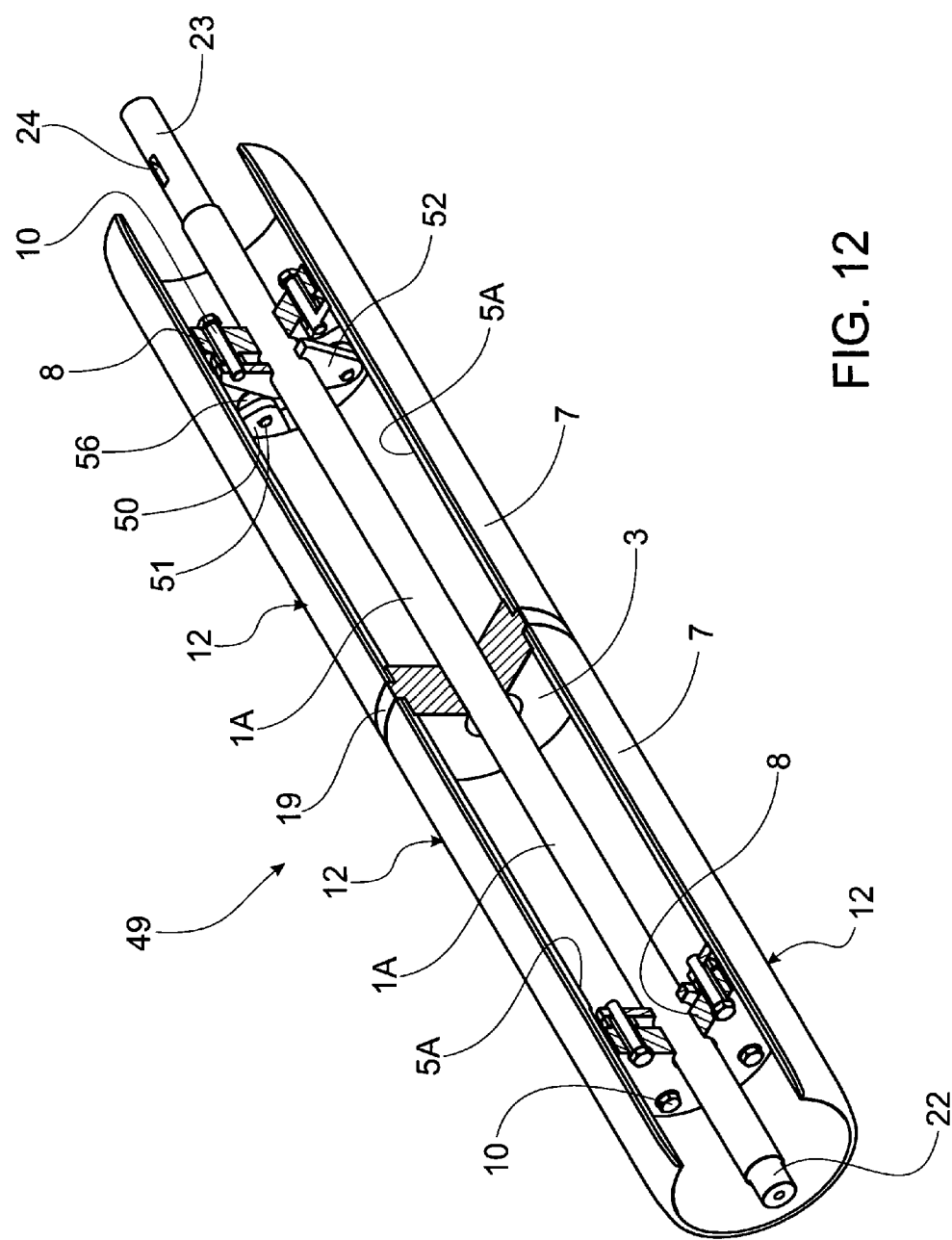
FIG. 12 is a perspective view similar to FIG. 2 in respect to the FIG. 11 embodiment.
Figure 13:
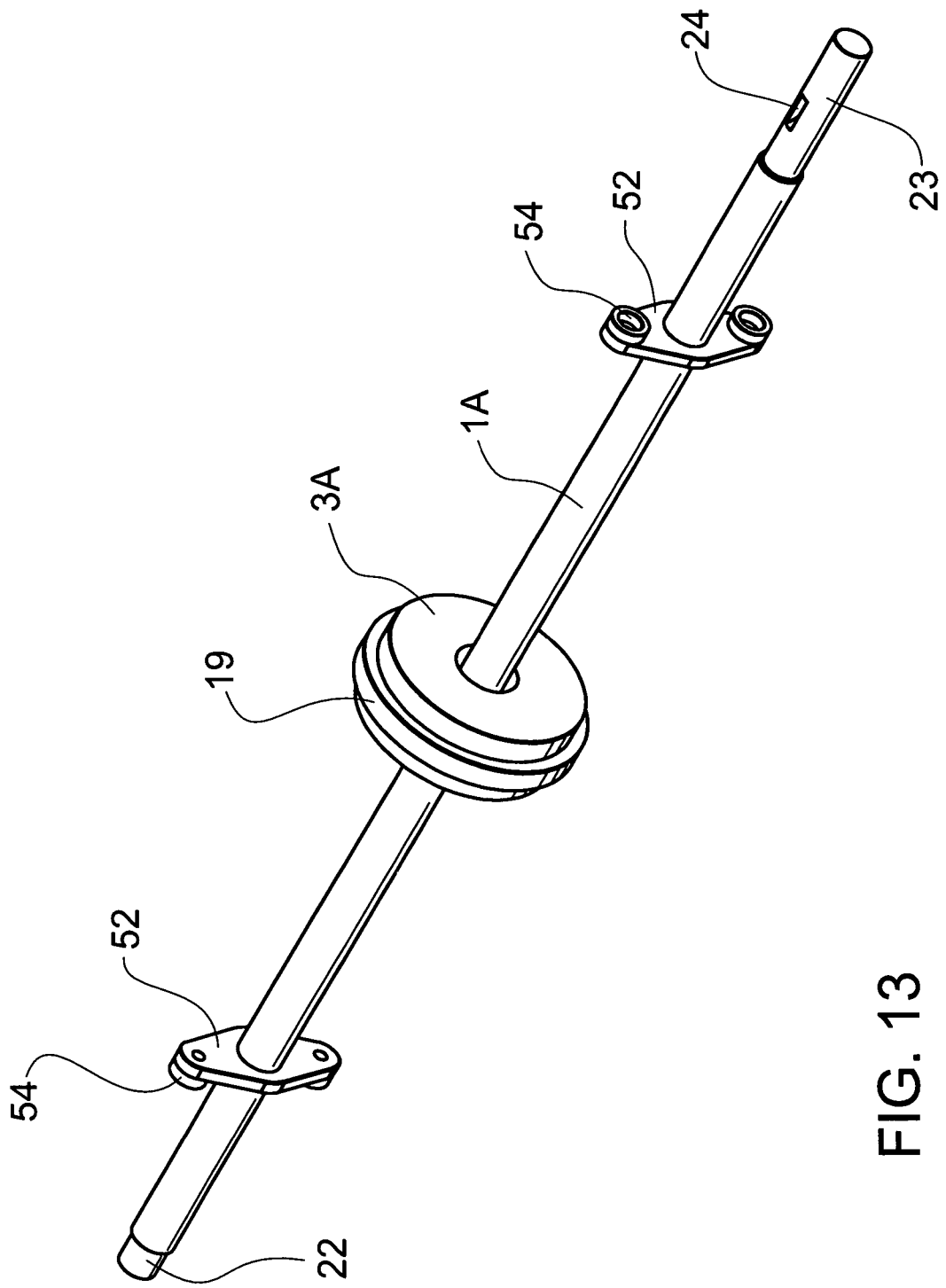
FIG. 13 is a view similar to FIG. 7 in respect to the FIG. 11 embodiment.

FIG. 12 shows a perspective view similar to FIG. 2 in regard to the embodiment of FIG. 11 and FIG. 13 shows a perspective view similar to FIG. 7 in relation to the embodiment of FIG. 11.

It will also be appreciated that the position of two opposed plates 50 gives adequate clearance for operation of the roller assembly 49 wherein plates 50 are spaced from plates 52 as shown in FIG. 12 by gap 56.

Reference may now be made to another embodiment of the invention shown in FIGS. 14, 14A, 15 and 16 showing roller assembly 49A wherein there is shown roller support axle or shaft 1B, driven roller components 12 each having an inner metal roller sleeve 5 and outer rubber sleeve 7 and coupling assemblies 14A each having disc 2A welded to shaft 1B, disc 6A welded to an internal surface of metal roller sleeve 5 and flexible coupling 8A interconnecting discs 2A and 6A. Flexible intermediate coupling 8A is located within disc 6A and has projections 57 which engage with corresponding recesses 58 of disc 6A, as shown. Flexible intermediate coupling 8A is also provided with recesses 59 which engage with corresponding projections 60 of disc 6A. As illustrated in FIG. 14A, the flexible intermediate coupling 8A occupies the "irregular-shaped" "substantially-annular" clearance or gap G between the discs 2A and 6A. Thus, in other words, disc 6A has a corrugated inner peripheral surface that engages with a corrugated outer peripheral surface of flexible intermediate coupling 8A. Flexible intermediate coupling 8A is also provided with a central aperture 61 having an inner corrugated surface having projections 63 and valleys or recesses 64 which engage with an inner corrugated disc 2A welded to shaft 1B, as shown. Disc 2A has an outer corrugated surface having projections 66 and valleys or recesses 67 located between each pair of projections 66. Disc 2A is also welded to a support plate 68. Disc 6A is also provided with spaced water drain apertures 69, as shown. There is also provided an inner locking ring 70 having fasteners 71 extending through attachment apertures 72 and outer locking ring 73 having fasteners 74 extending through associated attachment apertures 75.

Each of coupling assemblies 14A are assembled as shown in FIG. 16 wherein flexible intermediate coupling 8A engages with disc 6A and disc 2A as described above wherein fasteners 74 extend through aligned apertures 75, recesses 59 and apertures 76, as shown and apertures 71 extend through aligned apertures 72, recesses 64 and apertures 77 in disc 2A.

In the embodiment of the invention shown in FIGS. 14-16 it will be appreciated that central flexible coupling 3 has been retained but apertures 18 have now been omitted in a similar manner as shown in the FIGS. 7-9 embodiment or the FIGS. 11-13 embodiment.

Also plates 2, 6 and 8 of the FIGS. 1-6 and FIGS. 7-9 embodiments have been replaced by discs 2A, 6A and flexible intermediate coupling 8A in the FIGS. 14-16 embodiment. In regard to the FIGS. 11-13 embodiment plates 50 and 52 have been replaced by discs 2A and 6A and flexible coupling 8 has been replaced by flexible intermediate coupling 8A.

In the embodiment shown in FIGS. 14-16, the drive or torque transmitted to shaft 1 has now been totally transmitted through flexible intermediate coupling 8A to tube 12 without any torque being transmitted through locking pins or fasteners 71 and 74. The tube will also flex as described in the FIGS. 5-6 embodiment and thus, shaft 1 will always remain in a horizontal orientation and will not bend. Each of couplings 8A at either end of shaft 1 facilitates flexing of tube 1 as shown in the FIGS. 5-6 embodiment.

The roller assembly of the invention has advantages over the prior art fixed roller assemblies in that:

(i) an increased length of roller is obtainable which is in contact with the golfing green surface to provide increased friction, reduced pressure and thereby increased torque and increased traction;

(ii) superior ground hugging ability on flat surfaces or ground surfaces having variable curvature;

(iii) increased surface area with the ground lowering ground pressure;

(iv) increased traction in a driving situation;

(v) no ground ridging or line marks imparted to the ground; and (vi) flexibility across concave or convex surfaces because of the fact that each roller component is not rigidly mounted to the support shaft.

What is claimed is:

1. A roller assembly adapted to follow ground contours during operation, including:
    a pair of roller components, each roller component having a respective inner end connected to the other respective inner end by a flexible and movable primary coupling and each roller component having a respective outer end connected to a support shaft which extends through a hollow interior of each roller component by a respective secondary coupling;
    the support shaft extending through a hollow interior of each roller component and with a clearance through the primary coupling;
    wherein each of the secondary couplings comprises:
    an inner support disc attached to, or integral with, the support shaft at each end thereof;
    an outer support disc attached to, or integral with, the outer end of each roller component;
    fasteners interconnect each of the respective inner support discs and outer support discs to a respective flexible intermediate coupling; and
    wherein each inner support disc is spaced from the adjacent outer support disc by a gap there between.

2. The roller assembly as claimed in claim 1, wherein the flexible intermediate coupling is spaced from an internal surface of each roller component and an outer surface of the support shaft.

3. The roller assembly as claimed in claim 2, wherein the inner support plate or disc has a corrugated outer peripheral surface which engages with a corresponding corrugated inner surface of a central aperture of the flexible intermediate coupling.

4. The roller assembly as claimed in claim 2, wherein the outer support disc has a corrugated inner peripheral surface surrounding a central aperture of the outer support disc which engages with a corresponding corrugated outer surface of the flexible intermediate coupling.

5. The roller assembly as claimed in claim 2, wherein an outer locking ring is attached to the outer support disc.

6. The roller assembly as claimed in claim 5, wherein an inner locking ring is attached to the inner support disc.

7. The roller assembly as claimed in claim 6, wherein the inner locking ring is located within a central aperture of the outer locking ring.

8. The roller assembly as claimed in claim 5, wherein the outer locking ring is provided with fasteners that extend through apertures in the outer locking ring, through aligned passages of the flexible intermediate coupling and through aligned apertures of the outer support disc.

9. The roller assembly as claimed in claim 6, wherein the inner locking ring is provided with fasteners that extend through apertures in the inner locking ring and aligned passages of the flexible intermediate coupling and aligned apertures of the inner support disc.

* * * * *